United States Patent
Seidel et al.

(10) Patent No.: US 8,729,480 B2
(45) Date of Patent: May 20, 2014

(54) TOMOGRAPHY SCANNER WITH AXIALLY DISCONTINUOUS ARRAY

(75) Inventors: Jurgen Seidel, Bethesda, MD (US); Michael V. Green, Kensington, MD (US); Juan José Vaquero, Madrid (ES)

(73) Assignee: Trident Imaging, Inc., Gaithersburg, MD (US)

( * ) Notice: Subject to any disclaimer, the term of this patent is extended or adjusted under 35 U.S.C. 154(b) by 1047 days.

(21) Appl. No.: 12/239,331

(22) Filed: Sep. 26, 2008

(65) Prior Publication Data
US 2009/0065699 A1  Mar. 12, 2009

Related U.S. Application Data

(63) Continuation of application No. 10/945,541, filed on Sep. 20, 2004, now abandoned.

(60) Provisional application No. 60/504,321, filed on Sep. 18, 2003.

(51) Int. Cl.
*G01T 1/164* (2006.01)

(52) U.S. Cl.
USPC ..................................................... 250/363.04

(58) Field of Classification Search
USPC ..................................................... 250/363.04
See application file for complete search history.

(56) References Cited

U.S. PATENT DOCUMENTS

| | | | |
|---|---|---|---|
| 4,831,263 A | 5/1989 | Yamashita | |
| 4,843,245 A | 6/1989 | Lecomte | |
| 5,107,121 A * | 4/1992 | Lim et al. ................ | 250/363.05 |
| 5,122,667 A | 6/1992 | Thompson | |
| 5,349,191 A | 9/1994 | Rogers | |
| 5,591,977 A | 1/1997 | Green et al. | |
| 6,087,663 A | 7/2000 | Moisan et al. | |
| 6,288,399 B1 | 9/2001 | Andreaco et al. | |
| 6,362,479 B1 | 3/2002 | Andreaco et al. | |
| 6,490,476 B1 | 12/2002 | Townsend et al. | |

FOREIGN PATENT DOCUMENTS

| | | | |
|---|---|---|---|
| GB | 2 198 620 A | 6/1988 | |
| GB | 2 378 112 A | 1/2003 | |

OTHER PUBLICATIONS

Heinrich et al. Design optimization of the PMT ClearPET prototypes based on simulation studies with GEANT3, 2002 IEEE Nuclear Science Symposium Conference Record, Norfolk, VA, USA, Nov. 10-16, 2002 (Sep. 15, 2003), pp. 682-686.*

Ortuño et al. Multi-grid 3D-OSEM reconstruction technique for high resolution rotating-head PET scanners, 2006 IEEE Nuclear Science Symposium Conference Record, San Diego, CA, USA, Oct. 29-Nov. 4, 2006 (Mar. 16, 2007), pp. 2215-2218.*

"Molecular Imaging of Small Animals with Dedicated PET Tomographs," Chatziioannou, Arion F., European Journal of Nuclear Medicine, vol. 29, No. 1, Jan. 2002.

(Continued)

*Primary Examiner* — David Porta
*Assistant Examiner* — Shun Lee (57) ABSTRACT

A tomography scanner has intentionally designed, well defined gaps between detector rings with image reconstruction obtained with the use of conventional tomography data processing. The scanner is particularly advantageous as a small animal PET scanner.

16 Claims, 7 Drawing Sheets

(56) References Cited

OTHER PUBLICATIONS

"Performance Evaluation or the MicroPET R4 PET Scanner for Rodents." Knoess, Christof; Seigel, Stefan; Smith, Anne: Newport, Danny; Richerzhagen, Norbert; Winkeler, Alexandra, Jacobs, Andreas, Goble, Rhonda N.; Graf. Rudolph, Wienhard, Klaus; and Heiss. Wolf-Dieter, European Journal of Nuclear Medicine and Molecular Imaging, vol. 30, No. 5. May 2003.

Performance Evaluation of the MicroPET P4: A PET System Dedicated to Animal Imaging, Tai, Y.C.: Chatziioannou, A.; Seigel, S.; Young, J.; Newport, D., Goble, R. N.; Nutt, R.E.; and Cherry, S.R., Physics in Medicine and Biology, 46 (2001) 1845-1862.

"Design Evaluation of A-PET: A High Sensitivity Animal PET Camera," Suru, S.; Karp, J.S.; Perkins, A.E.; Freifelder, R.; and Muehllehner, G., IEEE Transactions on Nuclear Science, vol. 50, No. 5, Oct. 2003.

A Rotating PET Scanner Using BGO Block Detectors: Design, Performance and Applications, Townsend, David W.; Wensveen, Martin; Byars. Larry G.; Gelssbuhler, Antoine; Tochon-Danguy, Henri J.; Christin, Anna; Defrise, Michael, Bailey, Dale L., Grootoonk, Sylke, Donath, Alfred; and Null, Ronald, Journal of Nuclear Medicine. 1993; 34: 1367-1376.

"Design and Characterization of tridyPET-II: A High Resolution, High Sensitivity Dedicated Research Scanner," Rouze, Ned C. and Hutchins, Gary D., IEEE Transactions on Nuclear Sciance, vol. 50, No. 5, Oct. 2003.

"ECAT Art—A Conteuously Relating PET Camera: Performance Characteristics, Inibal Clinical Studies, and Installation Considerations in a Nuclear Medicine Department," Bailey, Dale L, Young Helen, Bloomfield, Peter M.; Meikle, Steven R., Glass Daphne; Meyers, Melvye J, Spinks, Terence J., Watson, Charles C., Luk, Paul; Peters, A. Michael, and Jones, Terry. European Journal of Nuclear Medicine, vol. 24, No. 1, Jan. 1997.

"The ECAT HRRT: Performance and First Clinical Application of the New High Resolution Research Tomograph," Wenherd, K.; Schmand. M., Casey, M.E.; Baker, K.; Bao. J.; Eriksson, L.: Jones, W.F., Knoess. C.; Lenox. M.; Lercher, M.; Luk, P.; Michel, C.; Reed, J.H.; Richerzhagen, N.; Treffert, J., Voilmar, S.; Young. J.W.; Heiss, W.D.; and Nutt. R., IEEE Transactions on Nuclear Science, vol. 49, No. 1, Feb. 2002.

Statistical Image Reconstruction in PET with Compensation for Missing Data, Kinahan, P.E., Fessler, J.A.; and Karp, J.S., IEEE Transactions on Nuclear Science, vol. 44, No. 4, Aug. 1997.

"Correction Methods for Missing Data in Sinograms of the HRRT PET Scanner," de Jong, Hugo W.A.M.; Boellaard, Ronald; Knoess, Christof; Lenox, Mark; Michel, Christiaan; Casey, Michael; and Lammertsma, Adriaan A., IEEE Transactions on Nuclear Science, vol. 50, No. 5. Oct. 2003.

"A Study of Image Errors Due to Detector Gaps Using OS-EM Reconstructions," Yu, D.-C. and Chang, W., IEEE 1998.

Design Optimization of the PMT-ClearPET Prototypes Based on Simulation Studies with GEANT3, Heinrichs, U.; Pietrzyk, U ; and Ziemons, K., IEEE Transactions on Nuclear Science, vol. 50, No. 5, Oct. 2003.

"Performance of the Fourier Rebinning Algorithm for PET with Large Acceptance Angles," Matej, Samuel; Karp, Joel S.; Lewitt, Robert M.; and Becher, Amir, Phys. Med. Biol. 43 (1998) 787-795.

"Exect and Approximate Rebinning Algorithms for 3-D PET Data," Defrise, Michael; Kinahan, P.E.; Townsend, D.W.; Michel, C.; Sibomene, M.; and Newport, D.F., IEEE Transactions on Medical Imaging. vol. 16. No. 2, Apr. 1997.

"High Resolution 3D Bayesian Image Reconstruction Using the MicroPET Small Animal Scanner." Qi. Jinyi; Leahy, Richard M.; Cherry, Simon R; Chatziioannou, Arion; and Farquhart, Thomas H., Phys. Med. Biol. 43, (1998) 1001-1013.

Fast EM-Like Methods for Maximum 'A Posteriori' Estimates in Emission Tomography, De Pierro, Alvaro R. and Yamagishi, Michel Eduardo Beleza, IEEE Transactions an Medical Imaging, vol. 34, No. 4, Apr. 2001.

"Effect of Depth of Interaction Decoding on Resolution in PET: A Simulation Study." Astakhov, V.; Gumplinger, P.; Morsan, C.; Ruth, T.J.; and Sossi, V., IEEE Transactions on Nuclear Science, vol. 50, No. 5, Oct. 2003.

Accelerated Image Reconstruction Using Ordered Subsets of Projection Data, Hudson, H. Malcolm and Larkin, Richard S., IEEE Transactions on Medical Imaging, vol. 13, No. 4, Dec. 1994.

"High Resolution PET, SPECT and Projection Imaging in Small Animals," M.V. Green, J. Seidel, J.J Vaquero, E. Jagoda, I. Lee and W.C. Eckelman. Computerized Medical Imaging end Graphics, 25 (2001) 79-86.

A Positron Camera Detector Design with Cross-Coupled Scintillators and Quadrant Sharing Photomultipliers. Wong, Wai-Hoi, IEEE Transactions on Nuclear Science, vol. 40, No. 4.

K. Ziemons at al,The ClearPET project: development of a 2nd generation high-performance small animal PET scanner; Nuclear Instruments and Methods in Physics Research.

A 537 (2005, pp. 307-311.

\* cited by examiner

TOMOGRAPHY SCANNER WITH AXIALLY DISCONTINUOUS ARRAY

CROSS REFERENCE TO RELATED PATENT APPLICATIONS

This application is a continuation of U.S. patent application Ser. No. 10/945,541 filed Sep. 20, 2004, now abandoned which claims priority from prior provisional patent application Ser. No. 60/504,321, filed Sep. 18, 2003, the entire disclosures of which are incorporated herein by reference.

BACKGROUND OF THE INVENTION

1. Field of the Invention

The present invention pertains to tomography scanners and, more particularly, to positron emission tomography (PET) scanners designed for imaging small animals or humans.

2. Brief Discussion of the Related Art

Small animal PET scanners are commonly used in research facilities and, desirably, have high spatial resolution and uniformity and high sensitivity as described in "Molecular Imaging of Small Animals with Dedicated PET Tomographs," Chatziioannou, Arion F., European Journal of Nuclear Medicine, Vol. 29, No. 1, January 2002. Commercial examples of such small animal PET scanners are the Concorde R4 and P4 "microPET" small animal PET scanners described in "Performance Evaluation of the MicroPET R4 PET Scanner for Rodents," Knoess, Christof; Seigel, Stefan; Smith, Anne; Newport, Danny; Richerzhagen, Norbert; Winkeler, Alexandra; Jacobs, Andreas; Goble, Rhonda N.; Graf, Rudolph; Wienhard, Klaus; and Heiss, Wolf-Dieter, European Journal of Nuclear Medicine and Molecular Imaging, Vol. 30, No. 5, May 2003 and "Performance Evaluation of the MicroPET P4: A PET System Dedicated to Animal Imaging," Tai, Y. C.; Chatziioannou, A.; Seigel, S.; Young, J.; Newport, D., Goble, R. N.; Nutt, R. E.; and Cherry, S. R., Physics in Medicine and Biology, 46 (2001) 1845-1862, and the Philips "Mosaic" small animal PET scanner described in "Design Evaluation of A-PET: A High Sensitivity Animal PET Camera," Surti, S.; Karp, J. S.; Perkins, A. E.; Freifelder, R.; and Muehllehner, G., IEEE Transactions on Nuclear Science, Vol. 50, No. 5, October 2003. These scanners utilize dense arrays of small, individual detector elements, such as scintillation crystals ultimately viewed by photomultiplier tubes that encode the location of a scintillation event. The terms "detector elements," "crystals" and "scintillating materials" are used interchangeably herein; however, it should be understood that the term "detector elements" includes any elements capable of detecting any type of radiation. The arrays are cylindrically arranged around a small diameter circle or polygon to form a mass of scintillating material that is nearly continuous in both the axial and circumferential directions. "Continuous" in this sense means that the individual scintillation crystals are as close together as possible such that any space between crystals is minimal and small compared to the crystal width and that the crystal positioning is replicated along the entire axial length of the scanning volume without appreciable or well defined gaps between rings of scintillation crystals. "Cylindrical detector array" as used herein means any geometric arrangement in which scintillation crystals or other detector elements circumferentially surround an imaging volume, e.g. in a circle, a polygon, an oval or the like, and have some axial extent. Prior art instrumentation for 3D PET imaging has focused on creating continuous axial and circumferential arrays of scintillator or other materials able to detect positron annihilation radiation emanating from a stationary imaging target or body, e.g. a small laboratory animal or a human. From these detected events, transverse section images of the radioactivity distribution from the body can be reconstructed that span the axial field of view of the device. The perceived need for continuity in detector arrays has been sufficiently compelling that prior art scanners have been specifically designed to avoid axially discontinuous arrays and have attempted to exploit novel array assembly methods, primarily optical/mechanical, that allow fabrication of continuous arrays of scintillation crystals, e.g. use of light guide coupling between crystal arrays and photodetectors, that allow close packing of crystals in both the axial and circumferential directions.

Dedicated PET scanners now on the market for either human or animal imaging targets use continuous cylindrical arrays of small scintillation crystals to define the imaging volume of the scanner. Discontinuous detector arrays e.g. paired, opposed flat panel detectors in time coincidence, are either mechanically rotated around the imaging target or the imaging target is rotated between fixed detectors to achieve the same result. See "A Rotating PET Scanner Using BGO Block Detectors: Design, Performance and Applications," Townsend, David W.; Wensveen, Martin; Byars, Larry G.; Geissbuhler, Antoine; Tochon-Danguy, Henri J.; Christin, Anne; Defrise, Michael; Bailey, Dale L.; Grootoonk, Sylke; Donath, Alfred; and Nutt, Ronald, Journal of Nuclear Medicine, 1993; 34: 1367-1376, "Design and Characterization of IndyPET-II: A High Resolution, High Sensitivity Dedicated Research Scanner," Rouze, Ned C. and Hutchins, Gary D., IEEE Transactions on Nuclear Science, Vol. 50, No. 5, October 2003, and "ECAT ART—A Continuously Rotating PET Camera: Performance Characteristics, Initial Clinical Studies, and Installation Considerations in a Nuclear Medicine Department," Bailey, Dale L.; Young, Helen; Bloomfield, Peter M.; Meikle, Steven R.; Glass, Daphne; Meyers, Melvyn J.; Spinks, Terence J.; Watson, Charles C.; Luk, Paul; Peters, A. Michael; and Jones, Terry, European Journal of Nuclear Medicine, Vol. 24, No. 1, January 1997. The design of such scanners is commonly driven by the perceived need to create continuous, or virtually continuous, crystal arrays in the sense defined previously. For example, some of such scanners use individual light guides to connect crystals in an array to a phototube to eliminate the effect of "dead space" at the edges of phototubes. In other scanners, a continuous annulus of glass serves as a light guide to connect the cylindrical array of closely spaced small crystals to a bank of phototubes. In other scanners, such as the scanner disclosed in U.S. Pat. No. 6,288,399 to Andreaco et al, a large, axially continuous polygonal crystal array is created by centering, and packaging together, many small crystal arrays on clusters of four phototubes, a geometry that allows large arrays to be made by replication of this pattern as described in "The ECAT HRRT: Performance and First Clinical Application of the New High Resolution Research Tomograph," Weinhard, K.; Schmand, M.; Casey, M. E.; Baker, K.; Bao, J.; Eriksson, L.; Jones, W. F.; Knoess, C.; Lenox, M.; Lercher, M.; Luk, P.; Michel, C.; Reed, J. H.; Richerzhagen, N.; Treffert, J.; Vollmar, S.; Young, J. W.; Heiss, W. D.; and Nutt, R., IEEE Transactions on Nuclear Science, Vol. 49, No. 1, February 2002. In each of these cases, technical innovations of one kind or the other are applied to allow small scintillation crystals to be packed closely together and to create detector arrays that are essentially continuous in both the circumferential and axial directions.

There are two primary reasons why the use of continuous arrays is deemed important. First, the idea that continuous arrays will intercept the largest fraction of annihilation radiation emanating from the target subject and, hence, will yield the maximum sensitivity for a particular ring diameter and axial length. Second, "classical" information theory has been thought to require continuous, regular and dense sampling of an imaging volume if imaging performance is to be as good as the system geometry permits. It has been generally believed that images reconstructed without dense and uniform sampling, i.e. without a continuous axial and circumferential distribution of scintillating material, would be of inferior quality, would contain artifacts or both. Degradation has been expected to increase if there were actual gaps in the detector array in either the circumferential or axial directions. In particular, while the effect on image quality of small circumferential gaps in detector arrays has been studied in some detail, see "Statistical Image Reconstruction in PET with Compensation for Missing Data," Kinahan, P. E.; Fessler, J. A.; and Karp, J. S., IEEE Transactions on Nuclear Science, Vol. 44, No. 4, August 1997, "Correction Methods for Missing Data in Sinograms of the HRRT PET Scanner," de Jong, Hugo W. A. M.; Boellaard, Ronald; Knoess, Christof; Lenox, Mark; Michel, Christiaan; Casey, Michael; and Lammertsma, Adriaan A., IEEE Transactions on Nuclear Science, Vol. 50, No. 5, October 2003, and "A Study of Image Errors Due to Detector Gaps Using OS-EM Reconstructions," Yu, D.-C. and Chang, W., IEEE 1998, the literature contains little information about changes in image quality if a detector array possesses axial gaps, see "Design Optimization of the PMT-ClearPET Prototypes Based on Simulation Studies with GEANT3," Heinrichs, U.; Pietrzyk, U.; and Ziemons, K., IEEE Transactions on Nuclear Science, Vol. 50, No. 5, October 2003.

While a continuous cylindrical array of scintillation crystals surrounding an imaging target is an effective way to intercept annihilation radiation from an imaging target, prior art methods possess significant practical disadvantages. For example, the need to connect individual or small groups of scintillation crystals to a phototube with a light guide adds complexity to the manufacturing process. More importantly, there is a demonstrable loss of scintillation light when the light passes into and through a light guide, thus, potentially reducing imaging performance. A similar loss occurs when a bulk light guide is used for the same purpose. That is, it has been believed that the "dead" regions at the edges of most photonic devices cannot be tolerated.

A number of three-dimensional (3D) image reconstruction methods have been proposed in recent years including the Fourier re-binning method (FORE) combined with some form of 2D image reconstruction, e.g. filtered backprojection (FBP) and the 3D re-projection method (3DRP), as described in "Exact and Approximate Rebinning Algorithms for 3-D PET Data," Defrise, Michael; Kinahan, P. E.; Townsend, D. W.; Michel, C.; Sibomana, M.; and Newport, D. F., IEEE Transactions on Medical Imaging, Vol. 16, No. 2, April 1997 and "Performance of the Fourier Rebinning Algorithm for PET with Large Acceptance Angles," Matej, Samuel; Karp, Joel S.; Lewitt, Robert M.; and Becher, Amir, Phys. Med. Biol. 43 (1998) 787-795, which are incorporated herein by reference. Iterative, statistical methods, such as 3D ordered subset expectation maximization (3D OSEM), as described in "Accelerated Image Reconstruction Using Ordered Subsets of Projection Data," Hudson, H. Malcolm and Larkin, Richard S., IEEE Transactions on Medical Imaging, Vol. 13, No. 4, December 1994, which is incorporated herein by reference and 3D maximum a posteriori image reconstruction (3D MAP) as described in "High Resolution 3D Bayesian Image Reconstruction Using the MicroPET Small Animal Scanner," Qi, Jinyi; Leahy, Richard M.; Cherry, Simon R.; Chatziioannou, Arion; and Farquhart, Thomas H., Phys. Med. Biol., 43, (1998) 1001-1013, both with system modeling, have also been introduced. A number of other algorithms that exploit the expectation maximization-maximum likelihood (EM-ML) approach with system modeling have also been studied as described in "Fast EM-Like Methods for Maximum "A Posterori" Estimates in Emission Tomography," De Pierro, Alvaro R. and Yamagishi, Michel Eduardo Beleza, IEEE Transactions on Medical Imaging, Vol. 30, No. 4, April 2001. Each of these methods allows the 3D information potentially available in cylindrical PET scanners without collimators to be reconstructed into 2D slices that fully exploit the increased sensitivity associated with 3D data collections compared to purely 2D collections. To date, these methods have been used only for image reconstruction from scanners having continuous cylindrical arrays of scintillation crystals.

SUMMARY OF THE INVENTION

The present invention avoids the need for specially designed array assemblies having axially continuous detector arrays by adapting existing image reconstruction methods to the presence of axial gaps in a detector array, by mechanical movement of the imaging target relative to an axially discontinuous detector array such that lines-of-response from parts of the object that might otherwise always lie in a gap are translated into locations where a detector array is continuous, and by arranging the detector modules in the detector array such that they are tilted with respect to one another in the axial direction.

In one aspect, the present invention permits the construction of a tomography scanner with axially spaced detector rings allowing direct coupling of scintillators with photon detectors, particularly position-sensitive photomultiplier tubes, and uses conventional image reconstruction methods with tomography scanners having axially discontinuous arrays of detector rings/scintillators. The effect of axial gaps in the detector arrays can be further minimized, if desired, by appropriate movement of the imaging target during imaging or by geometric arrangement of the detector elements in the cylindrical detector array. In one mode the tomography scanner of the present invention compensates for missing data introduced by discontinuities in detector arrays of tomography scanners by using three dimensional (3D) re-binning and/or reconstruction methods as discussed above.

A tomography scanner according to the present invention includes a plurality of axially aligned detector rings forming a cylindrical detector array that surrounds the imaging target. This cylindrical array contains one or more well defined gaps between the detector rings, which produce signals corresponding to points of interaction in three dimensions of radiation from the body within the detector array and means responsive to the signals to produce image reconstructions of some aspect of the imaging target throughout the axial field-of-view including the well defined gap.

In accordance with the present invention, a tomography scanner includes a plurality of axially aligned detector rings forming a cylindrical detector array around a body to be imaged with well defined gaps between the detector rings, the detector rings producing signals in response to radiation emanating from the body in three dimensions and means responsive to the signals to produce tomographic image reconstruction throughout the axial field-of-view including the well defined gaps.

Also, in accordance with the present invention, a positron emission tomography scanner includes a pair of detector rings forming a cylindrical detector array around a body to be imaged with a well defined gap between the detector rings, a plurality of detector modules carried by the detector rings producing signals corresponding to the three dimensional points of interaction in each of a pair of the detector modules in response to detection of time coincident photons from positron annihilations in a body containing a positron emitting compound and means responsive to the signals to produce tomographic image reconstruction of the spatial distribution of the amount of positron emitting compound in the body along the axial field-of-view of the cylindrical detector array.

In a further aspect, a small animal positron emission tomography scanner according to the present invention includes a plurality of spaced detector rings forming a cylindrical detector array for receiving the animal with a well defined gap between at least two of the detector rings which produce signals corresponding to positron annihilation radiation from the animal and means responsive to the signals to produce image reconstruction of the distribution of a positron emitting radiopharmaceutical in the animal.

The tomography scanner of the present invention compensates for missing axial data by using 3D iterative, statistical, reconstruction methods that do not specifically require complete and uniform spatial sampling, e.g. 3D OSEM, 3D MAP algorithms, and the like as discussed above, and that incorporate a model of the physics and geometry of the radiation detection/emission process during image reconstruction.

Some of the advantages of the present invention over the prior art are that the tomography scanner of the present invention can use less detector materials to span the same axial length, is less expensive and easier to manufacture, permits direct coupling of scintillators to photomultiplier tubes with substantially less light loss as occurs with light guides and uses conventional techniques or methods for reconstructing useful images along the full axial length of the scanner including the gap regions.

The above and still further features and advantages of the present invention will become apparent from the following description of preferred embodiments of the invention, particularly when taken in conjunction with the accompanying drawings, wherein like reference numerals are used to designate like or similar components thereof.

DESCRIPTION OF THE PREFERRED EMBODIMENTS

Tomography and tomographic images refer to images that together portray in three dimensions some property of an object being imaged. Commonly, such images may be in the form of a sequence of consecutive two dimensional transverse sections closely spaced along the axis of a tomography scanner to span the entire axial field-of-view of the scanner and the object therein. A "property" portrayed in such images can be, but is not limited to, the spatial distribution and frequency of occurrence of positron annihilation sites in the object, and a "property" may also refer to the distribution of attenuation coefficients, the location and amount of a light emitting compound distributed within the object, the amount and location of contrast material introduced into the object, and other such processes and phenomenon.

The term "detector ring" as used herein means an annular structure surrounding an imaging target or body formed of detector material that is responsive to incident radiation, such as x-rays, gamma rays, photon pairs from positron annihilation and the like. A detector ring may be formed of various materials and may be assembled in various geometries. Detector rings may be formed of scintillation material, e.g. lutetium oxyorthosilicate, or may be formed of solid state radiation detection material, e.g. intrinsic germanium. Detector rings can include material that is continuous in the circumferential direction, e.g. an annulus of scintillation material or solid state detector material, or can include independent segments of such materials tiled around the circumference of a detector ring to form a polygonal, rather than circular, ring geometry. Such discrete detector segments are referred to herein as "detector modules" to distinguish such segments from continuous rings of material. Detector modules may be further subdivided into smaller parts referred to herein as "detector elements". Commonly, many small detector elements would be packed together to form a detector module. A detector module would be coupled to a device sensitive to emissions from the material when struck by incident radiation, and signals from the device would serve to identify the location of the point of interaction of the radiation in the detector module ultimately necessary for creation of tomographic images. Solid state or continuous detector modules also contain detector elements having points of axial resolution with the spacing therebetween referred to as pitch.

In the case of scintillation detector elements, a number of readout devices are available for receiving the signals, including avalanche photodiodes (APDs) that may be coupled to individual detector elements in a detector module. Position-sensitive APDs can be coupled to a detector module made up of closely packed arrays of individual, optically isolated detector elements, and arrays of detector elements can be coupled to position-sensitive photomultiplier tubes. Each of these "readout" methods serves the purpose of producing electrical signals in response to the signals generated in the detector material by incident radiation. The electrical signals encode the position of the interaction within the detector module in either two or three dimensions (three if the detector module is capable of generating signals that also depend on the radial depth of penetration of the radiation into the module before interaction, i.e. a depth-of-interaction detector module).

In a preferred embodiment, each detector ring is formed of modules containing arrays of depth-of-interaction (DOI) capable phoswich scintillator detector elements, each formed of two or more scintillators with differing light decay times optically connected to one another end-on as described in the above mentioned U.S. Pat. No. 6,288,399 to Andreaco et al, the above mentioned Weinhard et al article and in "Effect of Depth of Interaction Decoding on Resolution in PET: A Simulation Study," Astakhov, V.; Gumplinger, P.; Moisan, C.; Ruth, T. J.; and Sossi, V., IEEE Transactions on Nuclear Science, Vol. 50, No. 5, October 2003; U.S. Pat. No. 4,843,245 to Lecomte, UK Patent No. GB 2 378 112 to Lecoq, and U.S. Pat. No. 6,362,479 B1 to Andreaco et al. Depth-of-interaction information can also be obtained by other means including measurement of the differential output of light from each end of a scintillation crystal of a single type or by the means described in UK Patent No. GB 2 198 620 to Yamashita et al, U.S. Pat. No. 4,831,263 to Yamashita, U.S. Pat. No. 6,087,663 to Moisan et al, U.S. Pat. No. 5,349,191 to Rogers and U.S. Pat. No. 5,122,667 to Thompson. Depth-of-interaction detectors are preferred because the number of lines-of-response penetrating the imaging volume is increased substantially compared to a non-DOI system with the same general ring and detector geometry and helps reduce the DOI parallax effect in the axial direction, as well as the transaxial direction. The present invention will be described hereinafter relative to a small animal PET scanner; however, it is understood that the concept of the present invention can be used with any tomographic scanner acquiring data in three dimensions, can be used for human or animal imaging and can utilize a variety of ring geometries, detector materials and readout methods.

Figure 1A:
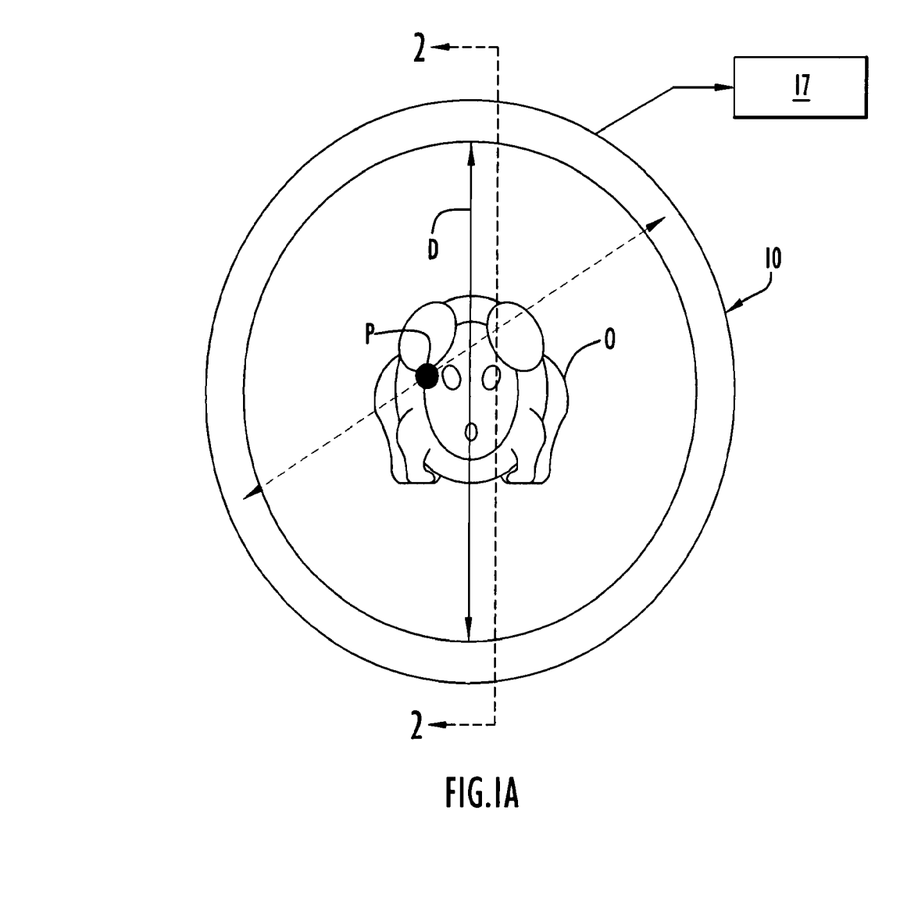
FIGS. 1A and 1B are diagrammatic front and side views, respectively, of a tomography scanner according to the present invention.
Figure 1B:
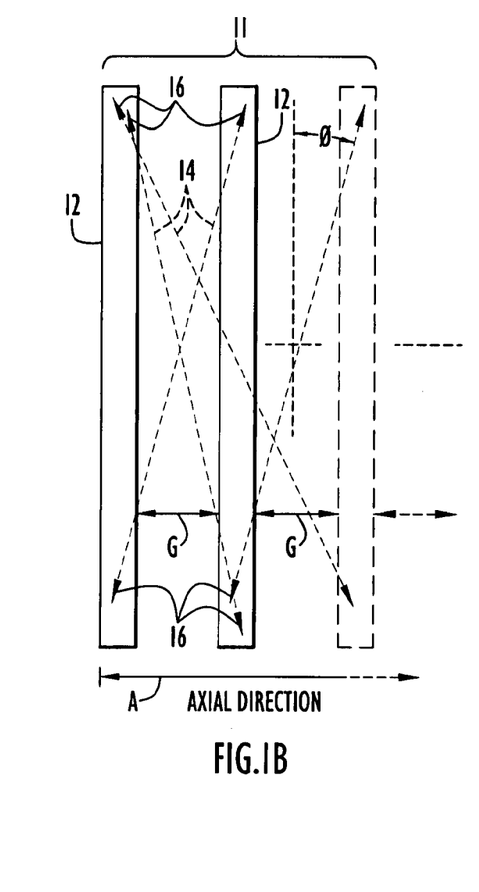
Figure 1C:
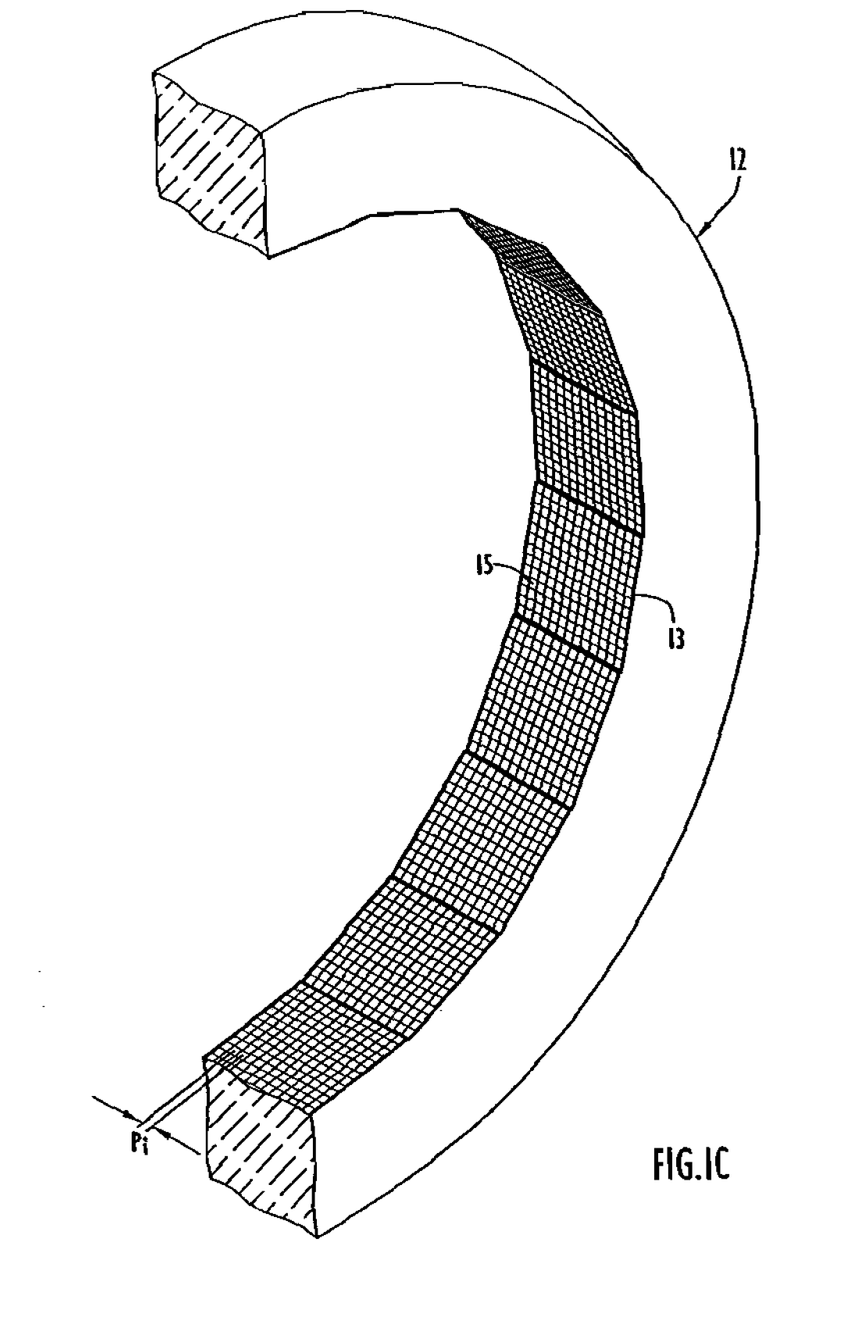
FIG. 1C is a broken perspective view of a detector ring including modules carrying detector elements.
Figure 2:
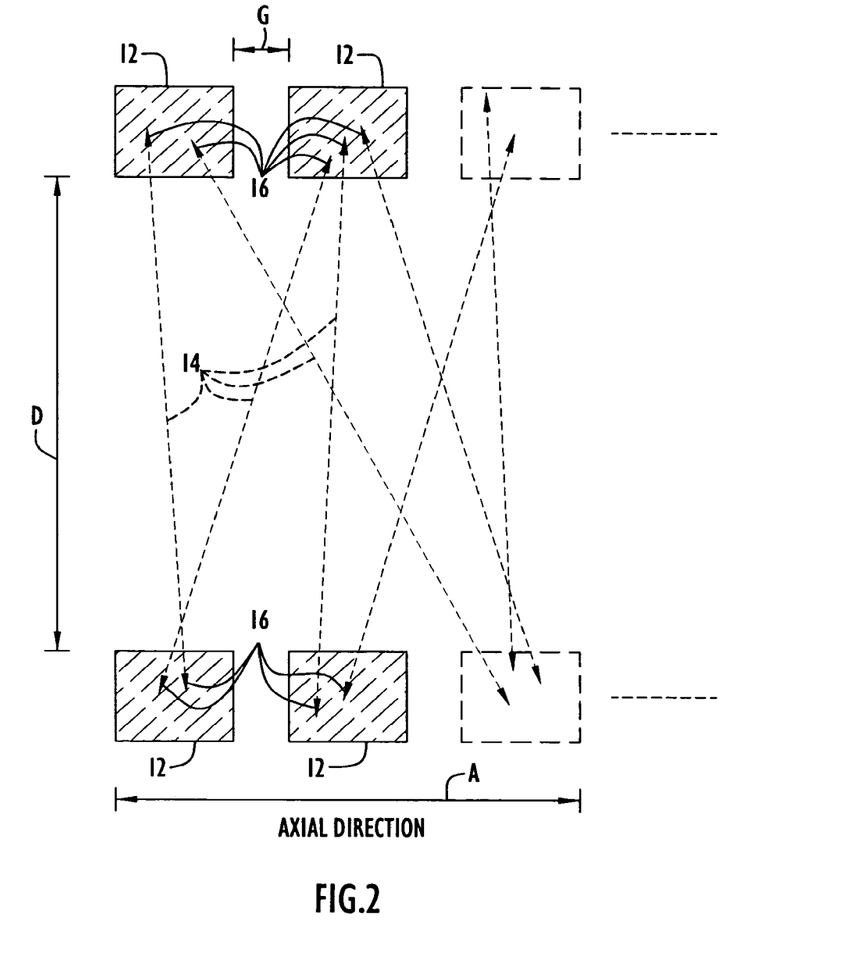
FIG. 2 is a diagrammatic side view taken along line 2-2 of FIG. 1 excluding the body O.

As shown in FIGS. 1A, 1B, 1C and 2, a PET scanner 10 according to the present invention includes a cylindrical detector array 11 formed of two or more detector rings 12 of detector modules 13, the detector rings having a diameter D surrounding body O (small animal) forming an imaging target or object having a positron annihilation site P and having an angle of obliquity 2. The detector modules 13 are made of a matrix (13×13) of detector elements 15. The detector rings 12 are spaced from each other by a well defined axial gap G which may or may not be constant from ring to ring. As best seen in FIG. 1B, each gap G extends between two detector rings 12 in the axial direction, and each gap G is circumferentially continuous between the two detector rings 12. Each detector ring 12 has its detector modules 13 uniformly aligned with one another in a transaxial direction as can be seen from FIG. 1C, for example. Dashed lines 14 indicate possible lines-of-flight of annihilation photons, and arrowheads 16 indicate points of interaction within the detector rings. The axial direction is indicated at A. In the preferred embodiment, the detector rings are stationary and the body O or imaging target is also stationary.

Data collection is supplied to a processor means 17 for image reconstruction. The preferred methods of image reconstruction for PET scanners according to the present invention are iterative statistical methods, such as 3D OSEM and 3D MAP, in which a model of the physical and geometrical response of the imaging system can be included in the image reconstruction process to correct for deleterious physical and/or geometrical effects including gaps in the detector array. These reconstruction methods could also be applied to the variations described below.

Figure 3:
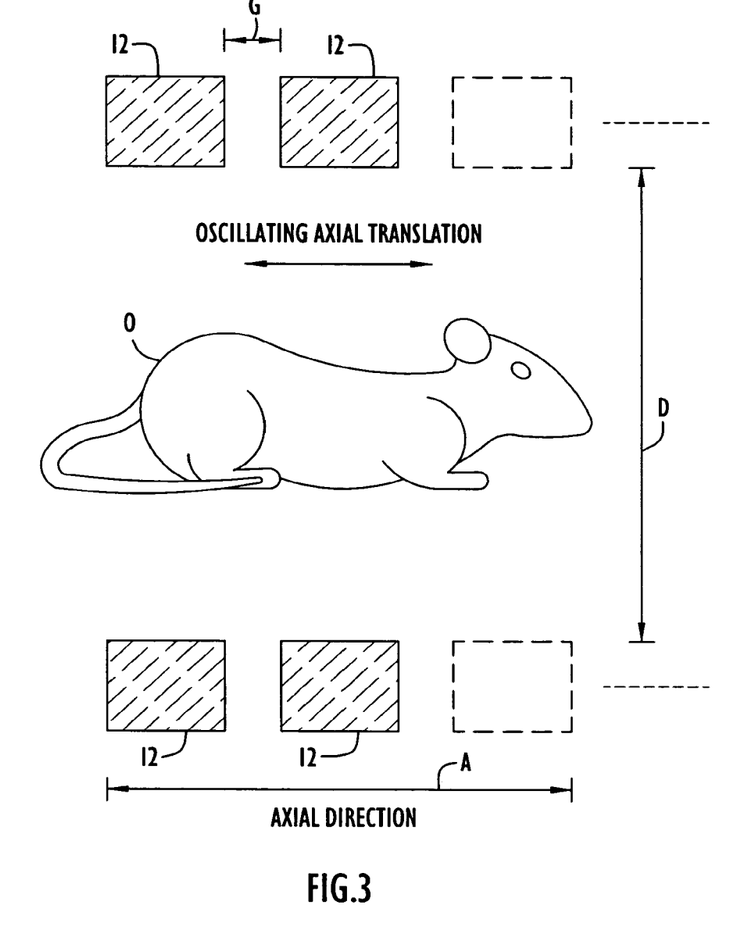
FIG. 3 is a diagrammatic side view taken along line 2-2 of FIG. 1 with the body O undergoing reciprocating movement.

The body O, such as a small animal, can, during imaging, be axially translated within the scanner as shown in FIG. 3, or the scanner can be translated with respect to the animal, as a means of reducing axial image degradation caused by gaps or spaces between detector rings in accordance with the present invention.

Figure 4:
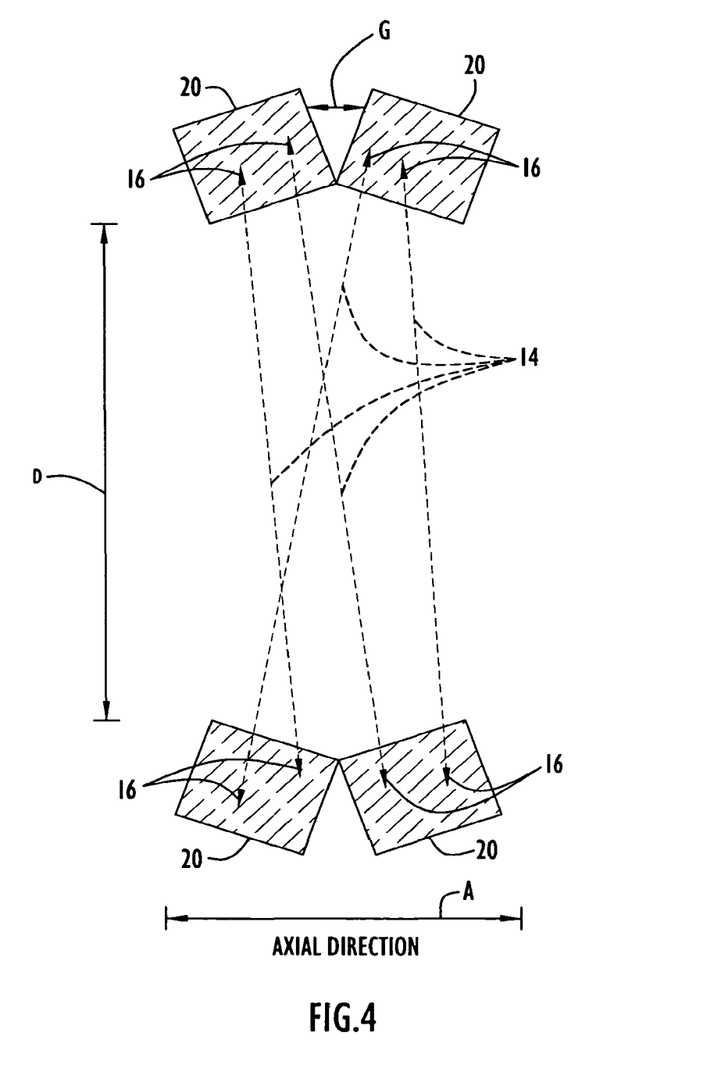
FIG. 4 is a diagrammatic side view of a modification of a tomography scanner according to the present invention where crystal arrays are tilted with respect to one another.

Another modification of the PET scanner according to the present invention is shown in FIG. 4 wherein detector modules within two detector rings 20 are tilted or angled toward one another to change the shape of the gap. In this modification, the ring diameter varies along the axial direction of the scanner and is not constant. In addition, tilting the detector modules opens small transaxial gaps (not shown in the drawings) between detector modules, the magnitude of which also varies with axial position. Additional detector rings can be added by tiling the perimeter of an axially oriented polygon or an ellipse centered on the geometric center of the scanner.

It has been observed that a prior art PET scanner with no gaps between detector rings will exhibit certain inherent transverse and axial imaging properties when image data are reconstructed with conventional 3D methods. In accordance with the present invention, the gap has a dimension where axial performance is acceptable compared to other distortions introduced by the geometry and/or physical performance of a normal scanner. The term "well defined gap" as used herein refers to intentionally designed gaps between detector rings, as opposed to spacing occurring from designs intended to produce axially continuous detector rings. The difference between a well defined gap and the very small inadvertent spaces that occur in prior art scanners can be distinguished in the following way. Detector modules formed of arrays of detector elements can be characterized in part by their "pitch", the center-to-center spacing between adjacent detector elements. In prior art scanners, the intention has been to span the entire axial field-of-view of the device with detector elements of constant pitch and to minimize any space between elements such as might be needed to optically isolate one detector element from adjacent detector elements. If pitch is the sum of the width W of a detector element and T, the thickness of any material between elements, the pitch is Pi=W+T. In the prior art, the intent has been to make the pitch Pi as close to W as possible by minimizing the thickness of intervening material. That is, the width of the spaces is small compared to the axial pitch of the detector elements. In contrast, gaps according to the present invention are purposefully chosen such that the gap width between detector rings is as great as or greater than, the pitch of the detector elements in the detector modules that form the detector rings.

The gaps G preferably have an axial dimension two to four times greater than the axial dimension or pitch of a detector element.

Figure 5A:
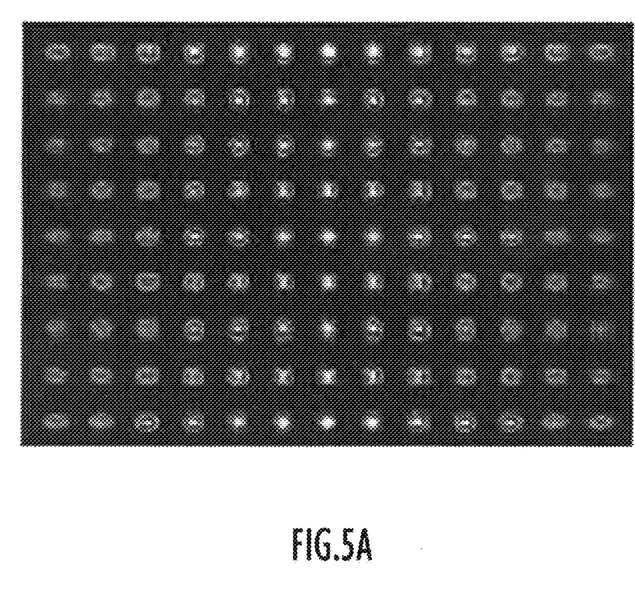
FIGS. 5A and 5B are 3D FORE/2D filtered backprojection images of point sources distributed in a coronal plane containing a ring diameter and imaged with a simulated small animal PET scanner with continuous detector rings and with a gap between detector rings, respectively.
Figure 5B:
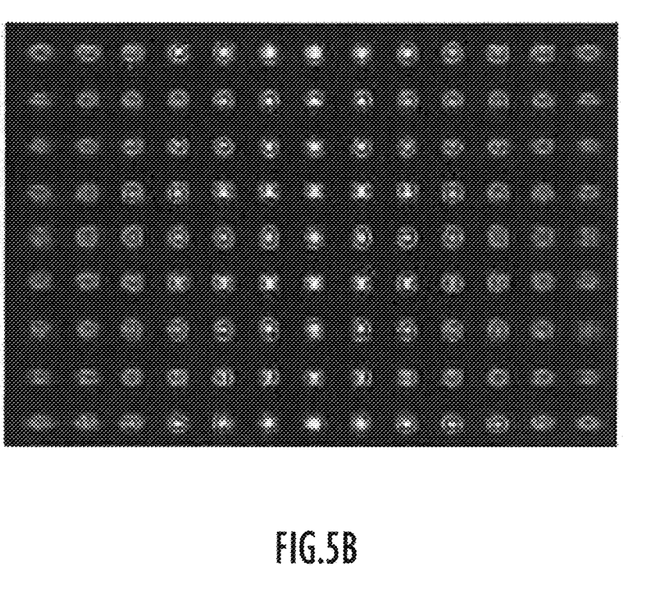

The point and distributed source responses of a Monte Carlo-simulated cylindrical PET scanner with two detector rings of detector modules without a gap and with a well defined gap equal to four times the pitch of the detector elements in each detector module are shown in FIGS. 5A, 6A and 5B, 6B, respectively. In FIGS. 5A and 5B, the simulated data were reconstructed by applying the FORE algorithm followed by 2D filtered back projection (FBP). Images in the gap region are obtained simply by applying the FORE algorithm to the acquired 3D image data to create the "virtual" sinograms that would have been obtained had the gap region actually been filled with "real" detector rings and then applying any of several 2D reconstruction methods to these sinograms to obtain transverse section images of the object. No other computational methods were used. The FORE+FBP method is an extreme test of the ability of an algorithm to compensate for missing axial data. If such methods yield modest reductions in axial imaging performance, iterative statistical methods that incorporate accurate models of system geometry and other characteristic of the radiation detection process, exhibit even less, or no, reduction in axial imaging performance. With these latter methods the activity distribution in the object within the gap region is estimated using lines-of-response that cross the gap region. In accordance with the present invention, once the gap distribution is known or estimated, transverse section images through the distribution can be created as if there had been actual detector rings that span the gap region.

FIGS. 5A and 5B show point sources spread over a sagittal plane that contains the central axis of simulated scanners with no axial gap between detector rings and with an axial gap between detector rings equal to four times the pitch (or axial dimension) of the detector elements in each module of the detector rings, respectively. The spacing between sources is 5 mm in the horizontal and vertical directions. In these images, the axial direction is vertical and the radial direction is left and right. As can be seen, the apparent size of the point sources generally increases as one moves to the left and right away from the central axis. This variation is due entirely to the radial parallax effect that occurs in all ring-type PET scanners and is present with, or without, a gap. There is only a slight apparent difference between the row of points in the 6 mm-wide gap region (middle row of points) of the two images, and the overall axial variation is very similar between the images. The measured transaxial FWHM values in the gap region are nearly identical to those in the gap-free image while the axial widths of the spots differ only slightly.

Figure 6A:
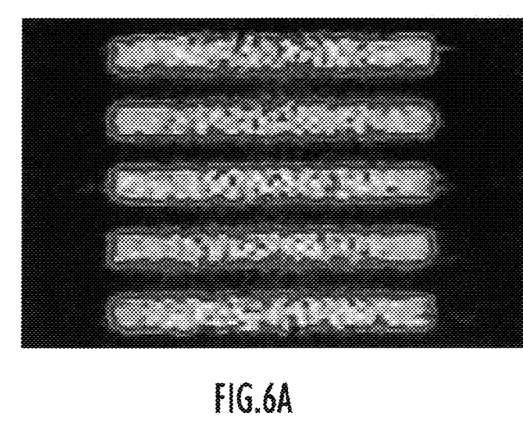
FIGS. 6A and 6B are 3D FORE/2D filtered backprojection images of a coronal plane through a simulated Defrise phantom containing the axis of the scanner and imaged with a simulated small animal PET scanner with continuous detector rings and with a gap between detector rings, respectively.
Figure 6B:
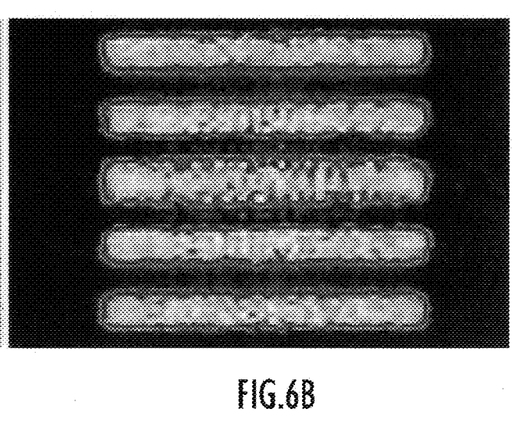
Figure 6C:
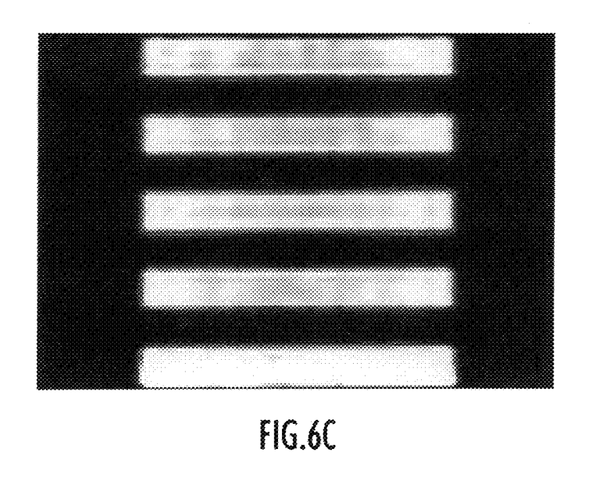
FIG. 6C is an image from a scanner with a gap between detector rings with data reconstructed with a 3D OSEM algorithm tailored to the gap geometry.

FIGS. 6A and 6B illustrate axial effects revealed by the Defrise phantom with no axial detector ring gap and an axial gap between detector rings equal to four times the pitch of the detector elements in each ring, respectively. The phantom is formed of parallel, coaxial cylinders 4.3 mm thick, every other one of which is filled with a pure positron-emitter and the intervening solid cylinders filled with nothing. The phantom detects defects that might exist in axial imaging performance and is the most commonly used phantom to reveal axial imaging flaws. Images shown in FIGS. 6A and 6B were reconstructed with the FORE+FBP method. As noted, FIG. 6A has no gap and FIG. 6B has an axial gap G equal to four times the detector element pitch in each detector ring. The images of the Defrise phantom show a sagittal plane that contains the central axis of the scanner. It would be expected that any distortions due to the "four pitch" gap would be most evident in the central plane (middle row) and would diminish as one moves away from the center along the axis of the scanner. In a perfect system, all of the horizontal bands would be the same width (in the vertical direction). FIGS. 6A and 6B show that some degradation occurs in the central plane within the gap region as predicted by "classical theory". The central band in the gap image is somewhat wider and fainter than the central band in the no gap image while, away from the central gap in the axial direction, the images are nearly identical. The maximum amplitude of the band at the center of the field of view in the four pitch-wide gap image is approximately 20% less than the same band in the no gap image. A maximum degradation in axial response of this magnitude is entirely acceptable in practice given the practical advantages of being able to use discontinuous detector arrays. Similar experiments using the preferred 3D OSEM algorithm with system modeling to reconstruct images from a dual ring phoswich-based scanner with a four pitch gap between rings is shown in FIG. 6C and reveals no significant degradation in axial resolution (vertical thickness of slabs). There is no measurable degradation in spatial resolution in the transverse plane anywhere along the axial field-of-view, outside or inside the gap region, with any of these methods, including the 3D FORE/ 2D filtered backprojection method, i.e. radial and tangential spatial resolution in the transverse plane at given radius do not vary with axial position for any of these reconstruction methods.

The overall performance of a tomography scanner with a small axial gap according to the present invention, aside from a modest degradation in axial response in the gap region with the most sensitive method, is not significantly different from a tomography scanner without a gap. The FORE method followed by 2D filtered backprojection were the only computational methods needed to achieve this result, these algorithms being proposed in the past only for use with continuous detector arrays and considered to absolutely require continuous detector arrays. All of the 3D reconstruction methods noted above possess the "gap-filling" property to a greater or lesser extent. In particular, the most resilient of these methods appear to be those based, not on classical reconstruction methods, but rather on iterative, approximating reconstruction methods that incorporate a mathematical model of a system's geometrical and physical response to annihilation radiation from an imaging volume surrounded by depth-of-interaction capable detector modules. The 3D OSEM algorithm with system modeling, for example, is capable of making nearly distortion-free image reconstructions including nearly perfect compensation for gaps according to the present invention.

As will be appreciated from the above, in accordance with the present invention, three-dimensional re-binning and/or reconstruction methods are able to compensate for missing data introduced by axial gaps or discontinuities. Accordingly, a tomography scanner 10 may be designed such that an axial gap is purposefully incorporated into the scanner. Such a gap reduces the number of detector elements needed to span a given axial field-of-view and permits light sources, such as phoswich/scintillator elements, to be optically coupled to sensors, such as positron-sensitive photomultiplier tubes, with no light guides. The present invention can be implemented with iterative, or statistical, reconstruction methods as well as with classical algorithms to provide the gap-filling function albeit with different amounts of axial image degradation.

Tomography scanners with axial gaps between detector rings in accordance with the present invention can also include oscillatory or linear translation of the imaging bed or imaging gantry in the axial direction as shown in FIG. 3. For a scanner with an axial gap, the imaging bed or the detector gantry can be driven to and fro in the axial direction during imaging or translated uni-directionally, and transaxial lines-of-response acquired for parts of the object that would otherwise always remain in the gap region. A translation of the bed or the gantry can move a point in the object out of the gap region and into the region directly sampled by the detector arrays. If the animal is translated through the imaging field or the bed or gantry oscillates axially at a reasonable frequency without moving the subject appreciably, an additional benefit accrues, namely that the usual triangular-like sensitivity profile along the scanner's axis will appear to become flatter and the statistical properties of the acquired data will be more uniform over the axial imaging field-of-view. It is understood that such mechanical movements of the bed or gantry require the position of the bed or gantry relative to the target to be known at all times so that lines of response can be transformed into a coordinate system fixed in the subject rather than the gantry before image reconstruction.

Tomography scanners with axial gaps between detector rings in accordance with the present invention can also use axially tilted detector modules. Conventional human and animal tomography scanners are usually designed such that the transverse dimensions of the detector array are constant in the axial direction. With the detector arrays tilted in the manner shown in FIG. 4, the effective axial gap width can be reduced. This manner of covering the imaging volume results in a variable ring diameter as one moves along the scanner axis and a slightly increasing transaxial gap width between modules as one moves toward the axial center of the system from each end. The effect of the gap is "smeared out" over the circumference of the array so its effect on the acquired data is reduced. Accordingly, axial resolution degradation will be less with detector geometry of FIG. 4, and the 3D re-binning/reconstruction methods noted earlier, or other post processing methods are more effective in restoring axial resolution in the gap region.

Typically, a PET scanner according to the present invention will be a stationary ring-type scanner with an aperture appropriate for small animals. Such a scanner typically includes a gantry containing the detector rings and an aperture into which the animal on an imaging bed can be accurately inserted into the imaging field of view. Such scanners might contain several computers for data acquisition and for data processing. A particular embodiment for a small animal PET scanner has a cylindrical detector array diameter between 10 and 40 cm, an aperture within two detector rings between 7 and 30 cm, a useful transverse field-of-view between 5 and 25 cm, an axial field of view between 4 and 20 cm and an axial gap between detector rings of between 2 and 20 mm. In a preferred embodiment, the animal would be surrounded by depth-of-interaction capable detector modules to increase spatial sampling within the imaging volume, each formed of arrays of small cross-section, e.g. 1-2 mm square, optically isolated scintillation crystals or detector elements, numbering on the order of 100s of detection elements per module and 10s of thousands of elements for an entire scanner. As is understood, positron emission tomography involves the sensing of signals corresponding to three dimensional points of interaction in each of a pair of the detector modules in response to detection of time coincident photons from positron annihilations in a body containing a positron emitting compound.

Inasmuch as the present invention is subject to various modifications and changes in detail, it is intended that all subject matter discussed above and shown in the accompanying drawings not be taken in a limiting sense.

What is claimed is:

1. A tomography scanner for obtaining an image of a body, comprising a plurality of axially aligned detector rings forming a cylindrical detector array around a body to be imaged with a well defined, intentional axial gap between each axially adjacent pair of said detector rings, each of said gaps being axially and circumferentially continuous between each axially adjacent pair of said detector rings, each of said gaps creating a cylindrical dead space between each axially adjacent pair of said detector rings, each of said detector rings including a plurality of detector modules aligned with one another transaxially throughout said detector ring, each of said plurality of detector modules comprising a matrix of detector elements, each of said detector elements having an axial dimension, each of said gaps having an axial dimension between each axially adjacent pair of said detector rings purposely selected to be greater than or equal to said axial dimension of said detector elements, said detector rings producing signals in response to radiation emanating from the body in three dimensions; and a data processor responsive to said signals to produce tomographic image reconstruction throughout the axial field-of-view including said gaps.

2. A tomography scanner as recited in claim 1 wherein said data processor performs an iterative statistical or a classical image reconstruction process.

3. A tomography scanner as recited in claim 1 wherein said data processor uses 3D OSEM and 3D MAP algorithms.

4. A tomography scanner as recited in claim 1 wherein said data processor performs an iterative statistical reconstruction method that models some or all of the physics and geometry of said detector array.

5. A tomography scanner as recited in claim 1 wherein said data processor utilizes 3D Fourier re-binning followed by 2D filtered back projection.

6. A tomography scanner as recited in claim 1 wherein said data processor utilizes 3D Fourier re-binning followed by a 2D iterative statistical reconstruction method.

7. A tomography scanner as recited in claim 1 wherein said data processor utilizes a 3D reprojection algorithm.

8. A tomography scanner as recited in claim 1 and further comprising means to provide relative reciprocating or unidirectional axial movement between the body to be imaged and said detector rings to reduce the effects of said gaps.

9. A tomography scanner as recited in claim 1 wherein said detector elements have a pitch, each of said gaps having an axial dimension purposely selected to be greater than or equal to said pitch of said detector elements.

10. A tomography scanner as recited in claim 1 wherein said gaps each have an axial dimension at least three times greater than said axial dimension of said detector elements.

11. A tomography scanner as recited in claim 1 wherein said detector elements of each of said detector rings have points of axial resolution with the spacing between said points defining a pitch and said gaps are purposely selected to have an axial dimension greater than said pitch.

12. A positron emission tomography scanner for obtaining an image of a body, comprising a pair of detector rings forming a cylindrical detector array around a body to be imaged with a well defined, intentional axial gap extending between said detector rings in an axial direction along said detector array, said gap defining a cylindrical dead space between said detector rings;

a plurality of detector modules in each of said detector rings producing signals corresponding to the three dimensional points of interaction in each of a pair of said detector modules in response to detection of time coincident photons from positron annihilations in a body containing a positron emitting compound, each of said detector modules carrying a plurality of detector elements arranged in a matrix where said detector elements have a pitch corresponding to the center to center spacing between adjacent detector elements, said gap having an axial dimension between said detector rings purposely selected to be in the range of two to four times greater than said pitch, each of said detector rings having said detector modules thereof uniformly aligned with one another in a circumferential direction within said detector array such that said gap is devoid of said detector elements; and a data processor responsive to said signals to produce tomographic image reconstruction of the spatial distribution of the amount of positron emitting compound in the body along the axial field-of-view of said detector array.

13. A positron emission tomography scanner as recited in claim 12 wherein said data processor performs an iterative process.

14. A positron emission tomography scanner as recited in claim 12 wherein said data processor provides classical reconstruction.

15. A positron emission tomography scanner as recited in claim 12 and further comprising means to provide relative reciprocating axial movement between the body and said detector array.

16. A tomography scanner as recited in claim 12 wherein said axial dimension of said gap is equal to four times said pitch.

* * * * *